United States Patent [19]
Doak

[11] Patent Number: 5,924,618
[45] Date of Patent: Jul. 20, 1999

[54] MAGNETIC DEVICE FOR SCORING GLASS

[76] Inventor: Donald A. Doak, 5901 Trout Ave., Gladwin, Mich. 48624

[21] Appl. No.: 08/821,431

[22] Filed: Mar. 21, 1997

[51] Int. Cl.[6] .................................. B26F 3/00; B26D 3/08
[52] U.S. Cl. .......................... 225/96; 30/164.95; 83/575; 83/614; 83/879; 83/886
[58] Field of Search ................................. 225/2, 94, 96; 83/879, 886, 614, 575; 30/164.95

[56] References Cited

U.S. PATENT DOCUMENTS

| | | |
|---|---|---|
| 1,462,101 | 7/1923 | Colson . |
| 2,243,778 | 5/1941 | Stansel . |
| 3,080,487 | 3/1963 | Schneider ................................. 83/575 |
| 3,288,006 | 11/1966 | Erlandson ................................. 83/879 |
| 3,584,773 | 6/1971 | Grove et al. ................................. 225/2 |
| 3,797,339 | 3/1974 | Pape et al. ................................. 83/575 |
| 3,884,132 | 5/1975 | Snodgrass ................................. 83/879 |
| 3,963,159 | 6/1976 | Krulwich . |
| 4,098,155 | 7/1978 | Onsolio ................................. 83/614 |
| 4,327,488 | 5/1982 | Connolly ................................. 30/164.95 |
| 4,383,458 | 5/1983 | Kitai et al. ................................. 83/614 |
| 4,479,476 | 10/1984 | Abreu . |
| 4,819,535 | 4/1989 | Thomas . |
| 5,038,486 | 8/1991 | Ducate, Sr. ................................. 83/435.14 |
| 5,322,001 | 6/1994 | Boda ................................. 83/614 |
| 5,524,515 | 6/1996 | Boda ................................. 83/614 |

*Primary Examiner*—M. Rachuba
*Assistant Examiner*—Sean Pryor
*Attorney, Agent, or Firm*—Mary M. Moyne; Ian C. McLeod

[57] ABSTRACT

A magnetic device (22, 222 or 322) for scoring glass (150) and a method for using the device to score glass. The system (100) for use with the device includes a scoring board (12), a scoring guide (18 or 218) and the device. The scoring guide has a smooth, flat outer surface (18E or 218C) and is constructed of either a magnetic or magnetically attractable material. The device includes a body (24 or 325) and a blade unit (26). The body has a smooth flat end and is preferably magnetic. Alternately, the flat end is constructed of a magnetically attractable material. To score glass, the glass sheet is placed on the scoring board and the guide is mounted on the board over the glass. The guide is mounted adjacent and parallel to the line to be scored on the glass. The flat smooth end of the device is mounted on the flat smooth outer surface of the guide so that the blade (26B) of the blade unit is aligned with the line to be scored. The user then exerts a downward pressure on the device and moves the device along the guide.

11 Claims, 8 Drawing Sheets

FIG. 8 ated to the scoring guide by magnetic means and magnetically attractable means between the surface of the scoring guide and the smooth outer surface of one of the ends of the body.

MAGNETIC DEVICE FOR SCORING GLASS

BACKGROUND OF THE INVENTION

(1) Field of the Invention

The present invention relates to a device for scoring glass. In particular, the present invention relates to a device for scoring glass which uses magnetic attraction between the body of the scoring device and the scoring guide to keep the device in contact with the scoring guide during scoring to ensure a precise score in the glass.

(2) Description of the Related Art

The related art has shown various types of devices for scoring and cutting glass. Illustrative are U.S. Pat. No. 1,462,101 to Colson; U.S. Pat. No. 2,243,778 to Stansel; U.S. Pat. No. 3,963,159 to Krulwich; U.S. Pat. No. 4,679,476 to Abreu and U.S. Pat. No. 4,819,535 to Thomas.

Colson describes a scribing device or tool which is held firm in place on a surface plate or other magnetizable surface without the use of mechanical clamps. The tool includes a base which is magnetically connected to a member such as a surface plate and a mounting post. The mounting post can be used for holding a number of tools including a scriber. The base remains in a fixed position on the base which the mounting post and tool are moved.

Stansel describes a glass cutter having a body with a cutter at one end and a handle at the other end. A collar is removably attached to the body and is provided with a guide. The guide is positioned on the body so as to engage and travel alongside a straight edge as the glass cutter is driven across a sheet of glass in the cutting operation.

Krulwich describes a glass cutter apparatus including a jig, an elongated mounting bar and a tool which may be guided by the bar and is used to score the glass sheet. The jig consists of two plates of magnetically attractable material adapted to hold a sheet of glass, magnets spaced under the plate and a resilient material midway under the plates where the plate edges meet. The apparatus is set to cut automatically with the resilient material being upward and the magnets pulling downward, cooperating in tension the glass above the adjacent edges of the jig.

Abreu describes a glass cutting system which allows for precisely sizing glass by cutting with standard glass cutting tools. The glass cutting system consists of a pair of base members, a pair of slide blocks disposed on a pair of slide block guides attached to the base members, a guide bar disposed on the slide blocks, a cutting board within the base and a glass cutter holder containing a glass cutter. The glass cutter holder has slots which slide over the guide members of the guide bar. The glass cutter holder also has a center holder guide member with a clearance slot which allows the passage of the glass cutter, so that the glass cutter extends between the guide members of the guide bar and into contact with the glass.

Thomas describes a glass cutting apparatus which has a handle portion which allows it to be pushed along the surface of the glass without unnatural or stressful rotation of the wrist while still mounting the cutting element portion substantially straight or perpendicular with the glass.

There remains the need for a device for scoring glass which allows for precise scoring of the glass and which uses magnetic attraction between the device and the scoring guide to obtain the precise scoring.

OBJECTS

It is therefore an object of the present invention to provide a scoring device which is magnetically attracted to a scoring guide to allow precise scoring of the glass along a line. Further, it is an object of the present invention to provide a scoring device which is magnetically attracted to the scoring guide and which easily moves along a smooth outer surface of the guide to allow easy scoring of the glass. Still further, it is an object of the present invention to provide a glass scoring system which includes a scoring device or unit where the device is magnetically attracted to the scoring guide to allow for precise scoring of the glass. Further still, it is an object of the present invention to provide a glass scoring combination including a scoring guide and a scoring device where the scoring guide is a T-square and the scoring device and the scoring guide are magnetically attracted to each other. Further, it is an object of the present invention to provide a method of scoring glass which allows for precise scoring of glass through the use of a scoring device which is magnetically attracted to a scoring guide. It is further an object of the present invention to provide a method for scoring glass using a glass scoring system where the glass is placed between the scoring board and the scoring guide so that the scoring device is moved along the scoring guide, the glass is scored along a line parallel to the scoring guide. Further, it is an object of the present invention to provide a precise scoring device which is inexpensive to manufacture and which allows for precise scoring of glass. These and other objects will become increasingly apparent by reference to the following drawings and the description.

DETAILED DESCRIPTION OF THE PREFERRED EMBODIMENT

The present invention relates to a unit for precision scoring glass following along a surface of a scoring guide, which comprises: a body having opposed ends with a sidewall spaced therebetween, wherein one of the ends has a smooth outer surface; and a glass scoring means mounted on the body for scoring the glass by movement of the glass scoring means and the body along the scoring guide wherein the body is attached to the surface of the scoring guide by magnetic means and magnetically attractable means between the surface of the scoring guide and the smooth outer surface of one of the ends of the body.

Further, the present invention relates to a glass scoring combination for scoring glass to be broken along a marking line, which comprises: a scoring surface having opposed ends; a scoring guide mounted on the scoring surface and having opposed ends with a sidewall having a smooth outer surface spaced therebetween, the scoring guide being positionable between the ends of the scoring surface so that the sidewall is spaced above the scoring surface and the glass; a glass scoring unit movable on the sidewall of the scoring guide, which comprises: (i) a body having opposed ends with a sidewall therebetween wherein one of the ends of the body has a smooth outer surface for mounting on the sidewall of the scoring guide by magnetic means and magnetically attractable means between the surface of the scoring guide and the smooth outer surface of the body; and (ii) a scoring means mounted on the body so that when the body is mounted on the scoring guide, the scoring means extends downward toward the scoring surface wherein to score the glass, the scoring unit is moved along the smooth outer surface of the sidewall of the scoring guide so that the scoring means contacts the glass to score the glass along a line wherein the glass is then broken along the score.

Still further, the present invention relates to a method for scoring glass along a marking line, which comprises: mounting a scoring guide having opposed ends with a sidewall spaced therebetween on a surface so that the scoring guide is spaced above the surface and defines the marking line; positioning the glass between the surface and the scoring guide so that the sidewall of the scoring guide is adjacent to the score line for the glass; positioning a body of a scoring unit on the scoring guide adjacent an end of the score line the body having opposed ends with a sidewall spaced therebetween, wherein one of the ends has a smooth outer surface; and a glass scoring means mounted on the body for scoring the glass by movement of the glass scoring means and the body along the scoring guide wherein the body is attached to the sidewall of the scoring guide by magnetic means and magnetically attractable means between the sidewall of the scoring guide and the smooth outer surface of one of the ends of the body so that the smooth outer surface of one of the ends of the body is in contact with the smooth outer surface of the sidewall of the scoring guide and the glass scoring means is aligned with the marking line; pressing downward on the scoring unit and moving the body along the sidewall of the scoring guide so that the glass scoring means scores the glass along the marking line; removing the glass from the surface; and breaking the glass at the marking line to separate the glass along the marking line.

Further still, the present invention relates to a method for scoring glass, which comprises: providing a glass scoring system including a scoring surface having opposed ends; a scoring guide mounted on the scoring surface and having Opposed ends with a sidewall having a smooth outer surface spaced therebetween, the scoring guide being positionable between the ends of the scoring surface so that the sidewall is spaced above the scoring surface and the glass; a glass scoring unit movable on the sidewall of the scoring guide, which comprises: a body having opposed ends with a sidewall therebetween wherein one of the ends of the body has a smooth outer surface for mounting on the sidewall of the scoring guide by magnetic means and magnetically attractable means between the surface of the scoring guide and the smooth outer surface of the body; and a scoring means mounted on the body so that when the body is mounted on the scoring guide, the scoring means extends downward toward the scoring surface and wherein to score the glass, the scoring unit is moved along the smooth outer surface of the sidewall of the scoring guide so that the scoring means contacts the glass to score the glass along a line wherein the glass is then broken along the score; scoring the glass with the scoring means by pressing downward on the scoring unit and moving the unit along the sidewall of the scoring guide; and breaking the glass at the marking line to separate the glass along the marking line.

Finally, the present invention relates to a method for scoring glass using a surface; a scoring guide mounted on the surface with a sidewall defining a marking line and a scoring means which is moved along the marking line, the improvement which comprises: providing a unit for scoring the glass along the sidewall of the scoring guide, which comprises: (i) a body having opposed ends with a sidewall spaced therebetween, wherein one of the ends has a smooth outer surface; and (ii) a glass scoring means mounted on the body for scoring the glass by movement of the glass scoring means and the body along the scoring guide wherein the body is attached to the surface of the scoring guide by magnetic means and magnetically attractable means between the surface of the scoring guide and the smooth outer surface of the body.

Figure 1:
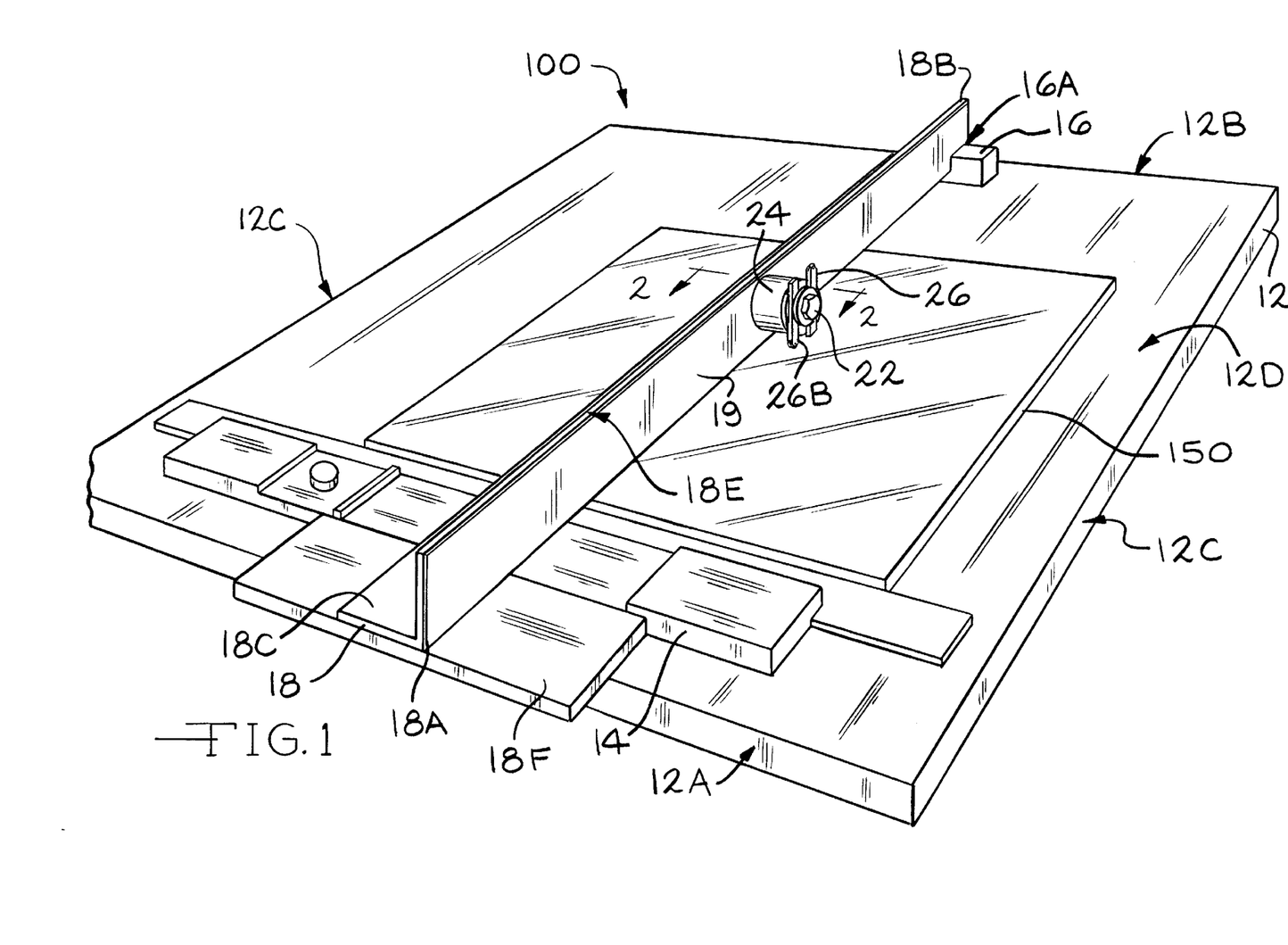
FIG. 1 is a perspective view of the scoring system 100 showing the scoring board 12, the scoring guide 18 with the glass sheet 150 spaced therebetween and the scoring unit 22 of the first embodiment mounted on the scoring guide 18.
Figure 4:
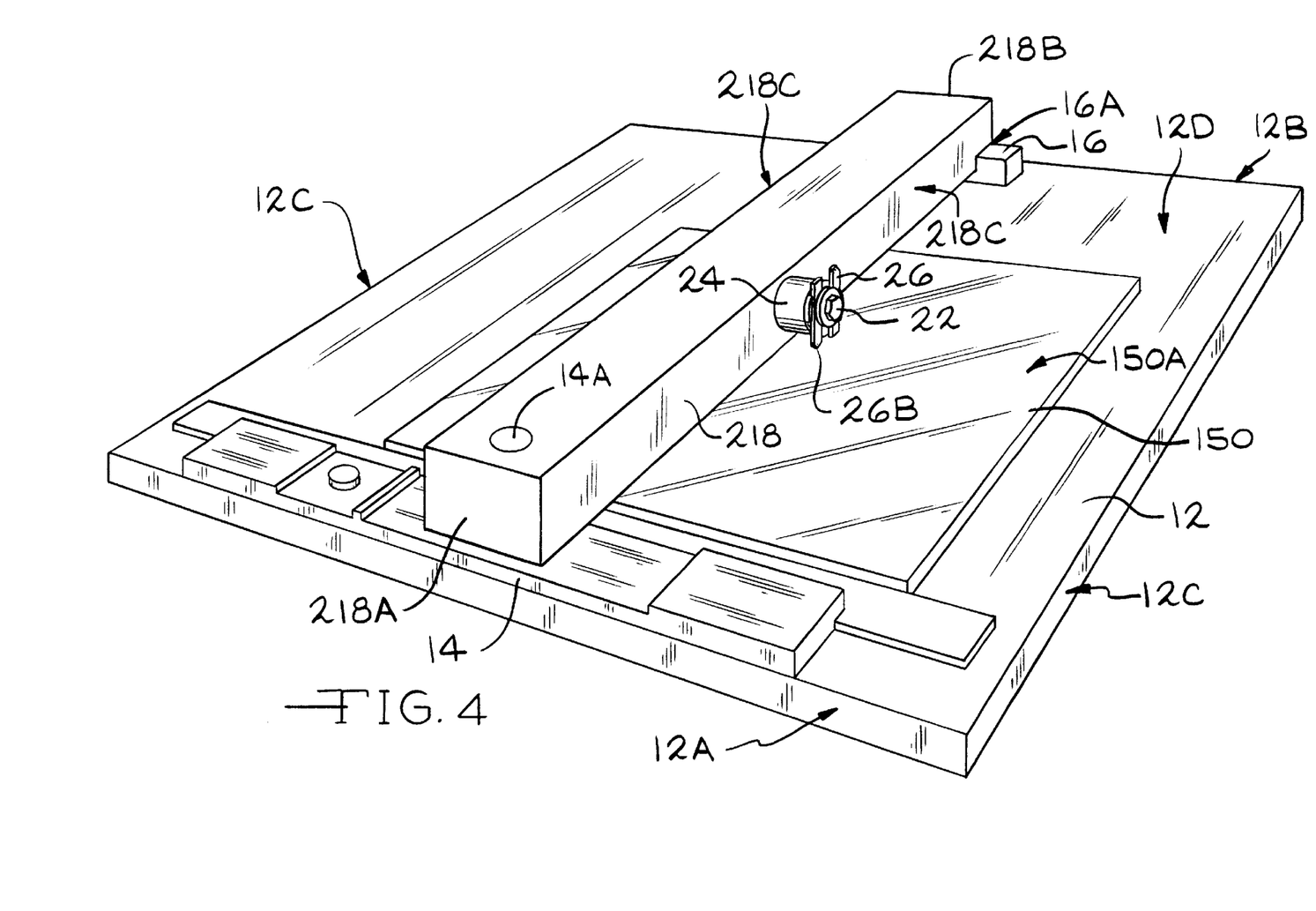
FIG. 4 is a perspective view of the scoring system 100 showing the scoring guide 218 of another embodiment.
Figure 5:
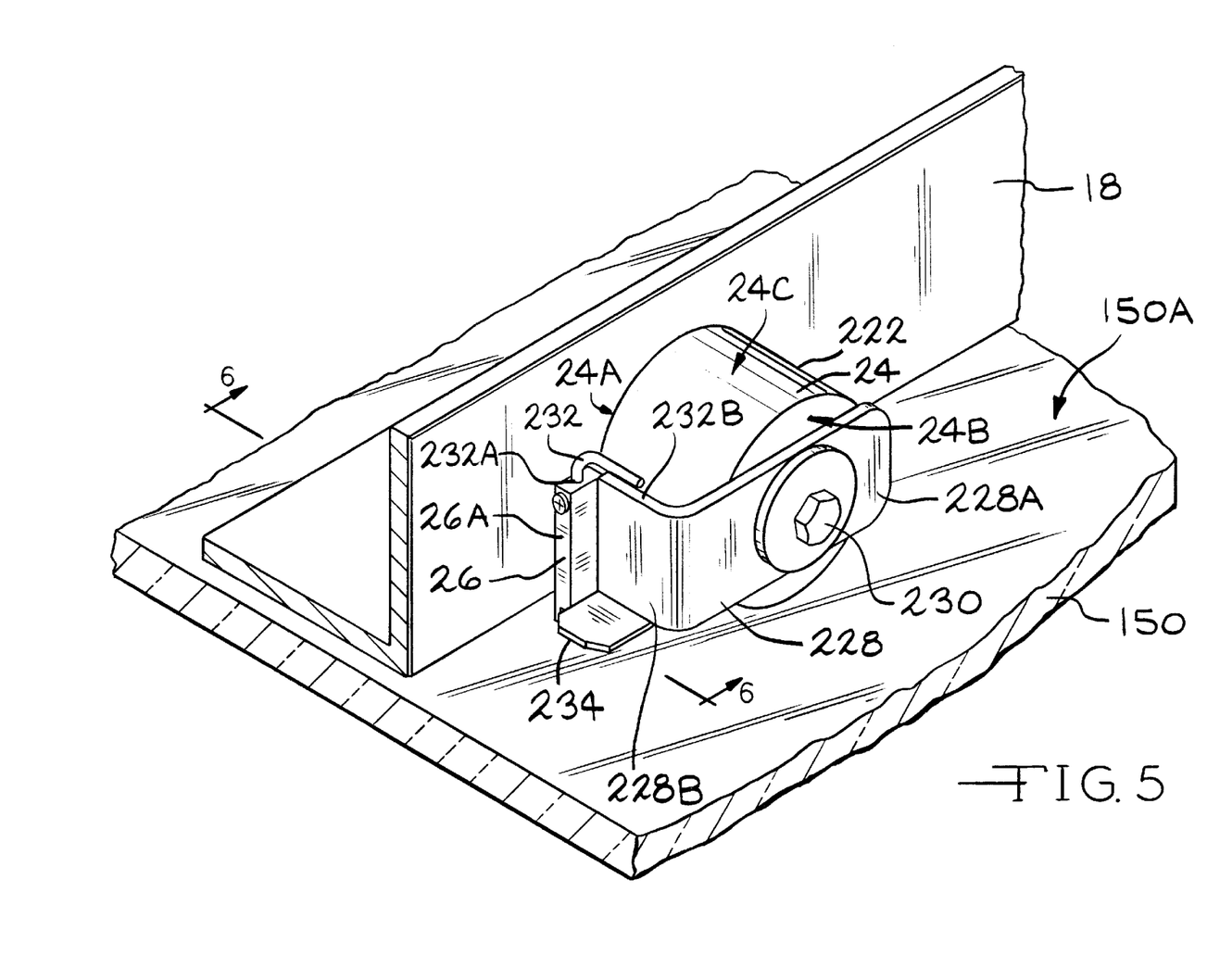
FIG. 5 is a perspective view of the glass scoring unit 222 of the second embodiment.
Figure 7:
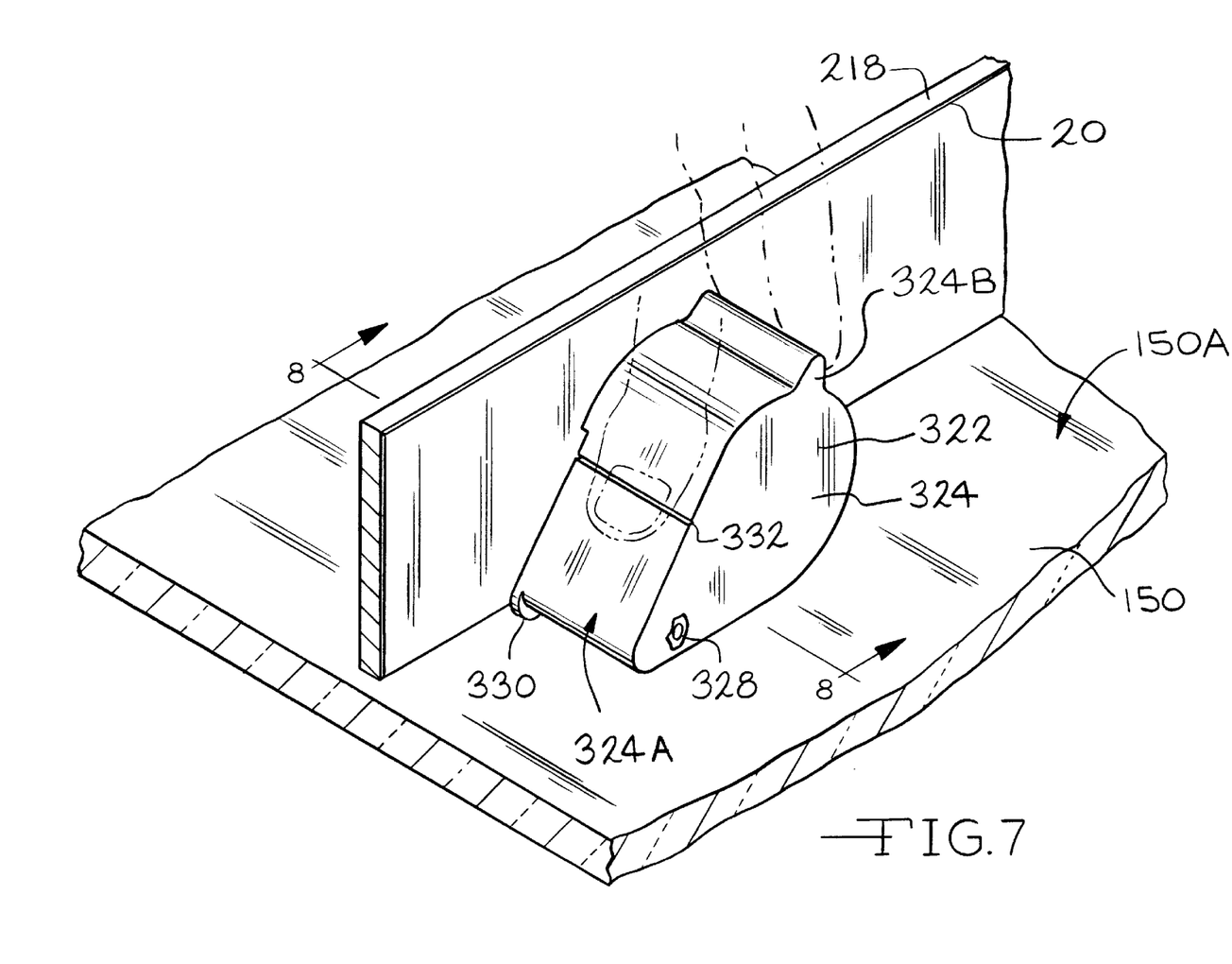
FIG. 7 is a front view of the glass scoring unit 322 of the third embodiment.

FIGS. 1, 5 and 7 show the glass scoring devices or unit 22, 222 or 322 of the first, second and third embodiments of the present invention. The scoring units 22, 222 or 322 are preferably used in a glass scoring system 100 (FIGS. 1 and 4). The system 100 includes a scoring board 12, a scoring guide 18 or 218 and a scoring unit or device 22, 222 or 322. The scoring board 12 is preferably similar to Morton boards which are manufactured by Morton Glass Works of Morton, Ill. and which are used for scoring glass. These boards are well known in the art. The scoring board 12 is preferably rectangular in shape having a top edge 12A, a bottom edge 12B and opposed sides 12C extending therebetween forming a top surface 12D. The top surface 12D of the board 12 is preferably provided with graduations or markings (not shown) which allow the glass 150 to be scored and cut at different measurements and at different angles. The scoring board 12 preferably has mounting blocks 14 and 16 on the top surface 12D along the top and bottom edges 12A and 12B to allow for mounting of the scoring guide 18 or 218 on the top surface 12D of the scoring board 12. The top mounting block 14 adjacent the top edge 12A of the board 12 preferably has a nub 14A which mates with a hole in the end 18A or 218A of the scoring guide 18 or 218 to hold the scoring guide 18 or 218 in place on the board 12 (FIG. 4). The bottom mounting block 16 adjacent the bottom edge 12B of the board 12 preferably has a notch 16A into which the end 18B or 218B of the scoring guide 18 or 218 is mounted to hold the end 18B or 218B of the scoring guide 18 or 218 in place on the board 12 (FIGS. 1 and 4).

In one embodiment, the scoring guide 18 preferably has a first end 18A and a second end 18B and is L-shaped with a first leg 18C and a second leg 18D all extending therebetween (FIGS. 1, 2, 5 and 6). The scoring guide 18 is mounted adjacent the top surface 12D of the scoring board 12 so that a first leg 18C of the guide 18 extends parallel and spaced above the top surface 12D of the scoring board 12 and the second leg 18D extends upward, perpendicular to the first leg 18C and to the top surface 12D of the scoring board 12 (FIG. 1). In the preferred embodiment, the outer surface 18E of the exterior side of the second leg 18D opposite the first leg 18C is preferably smooth and flat. The scoring guide 18 is preferably positioned so that the first end 18A is mounted adjacent the top edge 12A of the board 12 and the second end 18B is mounted adjacent the bottom edge 12B of the board 12. In the preferred embodiment as shown in FIG. 1, the scoring guide 18 is in the form of a T-square having a cross bar 18F mounted on the first leg 18C at the first end 18A of the scoring guide 18 on the side opposite the second leg 18D. The scoring guide 18 is preferably mounted so that the cross bar 18F is on the top surface 12D of the board 12 adjacent the top edge 12A of the scoring board 12 (FIG. 1).

In another embodiment, the scoring guide 218 is a single piece having a rectangular shape which is mounted perpendicular and spaced above the top surface 12D of the scoring board 12 (FIG. 4). In the preferred embodiment, the outer surface 218C of both sides of the scoring guide 218 is smooth and flat. In the alternate embodiment, the scoring guide 218 is mounted between the mounting blocks 14 and 16 of the board 12 above the top surface 12D of the board 12.

In either embodiment, the guide 18 or 218 may be pivotally attached at one end 18A, 218A or 18B, 218B to one end of the scoring board 12 such as by a hinge (not shown). The pivotability of the guide 18 or 218 allows the glass sheet 150 to be easily positioned on the board 12 below the guide 18 or 218. This is important when the system 100 is used to cut large sheets of glass 150.

Figure 2:
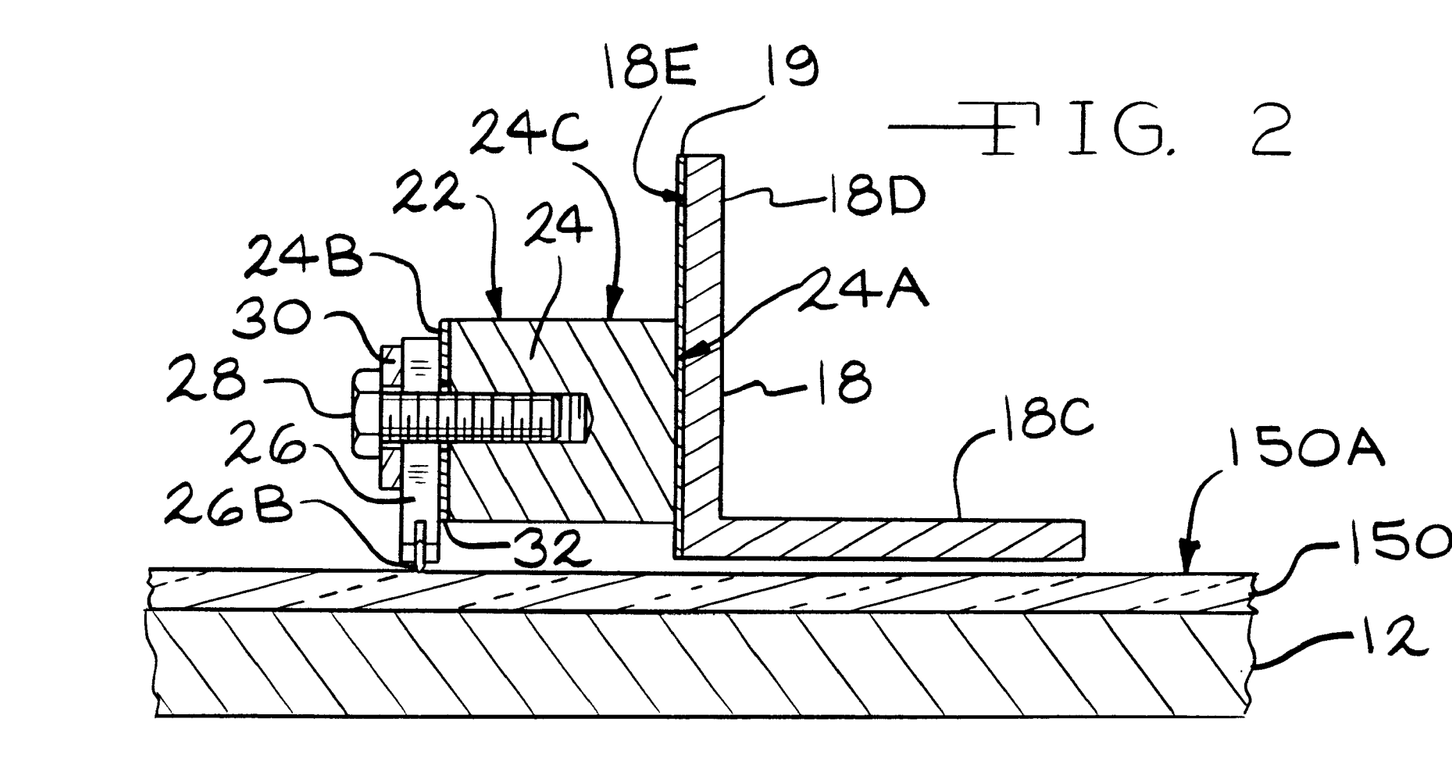
FIG. 2 is a cross-sectional view of the scoring unit 22 of the first embodiment along the line 2—2 of FIG. 1 showing the blade 26B in contact with the top surface 150A of the glass sheet 150.

The scoring guides 18 or 218 are preferably constructed of a magnetically attractable material such as steel. Alternatively, the scoring guide 18 or 218 is constructed of a magnetic material. In the preferred embodiment, the second leg 18D need only be constructed of a magnetic material or a magnetically attractable material. Alternatively, the scoring guide 18 or 218 is constructed of a non-metallic material such as aluminum or plastic and a strip of magnetic material 19 is mounted on the outer surface 18E or 218C of the scoring guide 18 or 218 (FIGS. 1 and 2). A lubrication material 20 such as polytetrafluoroethylene (Teflon®) may be provided on the outer surface 18E or 218C of the scoring guide 18 or 218 (FIGS. 5 to 8). The lubrication layer 20 preferably has a smooth outer surface such that the scoring unit 22 moves easily along the scoring guide 18 or 218.

Figure 3:
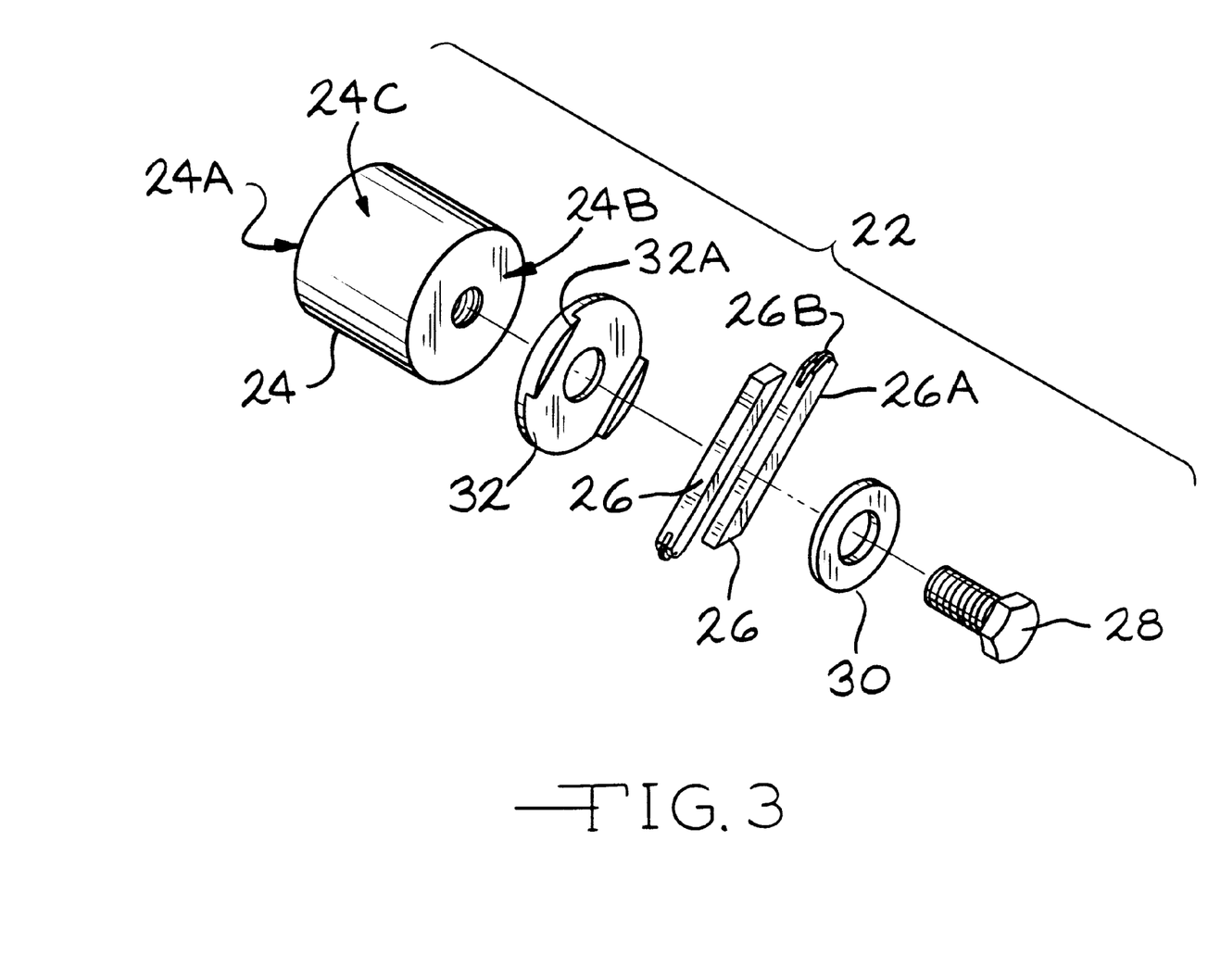
FIG. 3 is an exploded view of the scoring unit 22 of the first embodiment.

The scoring unit or device 22 or 222 of the first or second embodiments preferably has a body 24 and a scoring blade unit 26 mounted on the body 24 (FIGS. 3 and 5). The body 24 of the scoring unit 22 preferably has a cylindrical shape with a first end 24A and a second end 24B with a sidewall 24C spaced therebetween. However, it is understood that the body 24 of the device 22 could have a variety of different shapes. In the preferred embodiment, the first end 24A of the body 24 is magnetized. The second end 24B of the body 24 may or may not be magnetized. The first end 24A of the body 24 preferably has a magnetic pull or attraction between 1.0 and 50.0 lbs. However, the magnetic pull of the body 24 is such as to hold the body 24 in contact with the scoring guide 18 or 218 while allowing the scoring unit 22 to be easily moved along the scoring guide 18 or 218. The greater the pull, the greater the friction between the scoring unit 22 or 222 and the scoring guide 18 or 218 and the less likely the scoring unit 22 or 222 will be pulled away from the scoring guide 18 or 218 by the user. The amount of magnetic pull is preferably dependent on the user and the specific use. In the preferred embodiments, the scoring system 100 is used by hobbyist for in home use. The first end 24A of the body 24 is preferably flat and smooth so that the first end 24A of the body 24 is perfectly flat against the outer surface 18E or 218C of the scoring guide 18 or 218. The flatness of the first end 24A of the body 24 enables the user to accurately determine the position of the scoring blade unit 26. The flatness of the first end 24A also helps to prevent excessive, extraneous movement of the body 24 during movement along the guide 18 or 218. The outer surface of the sidewall 24C of the body 24 is preferably smooth to enable the user to easily grip the body 24 of the scoring unit 22. The body 24 is preferably a contact magnet similar to the pot magnet sold by KBC Tools located in Detroit, Mich. In an alternate embodiment, the smooth end 24A of the body 24 is provided with a lubrication layer such as polytetrafluoroethylene (Teflon®). The outer surface of the lubrication layer is flat and smooth so that the body 24 is perfectly square with the guide 18 or 218.

The scoring blade unit 26 includes a blade support 26A and a scoring blade 26B. The scoring blade 26B of the blade unit 26 is preferably a standard circular glass scoring blade. The blade unit 26 is preferably similar to those well known in the art such as the Glass Cutting Wheel manufactured by Toyo of Japan. The scoring blade 26B of the blade unit 26 is preferably a standard circular glass scoring blade. The scoring blade unit 26 is mounted on the body 24 of the device 22 or 222 such as to extend downward beyond the sidewall 24C of the body 24. In the first embodiment, the scoring blade unit 26 is mounted on the second end 24B of the body 24 opposite the first end 24A so that when the first end 24A of the body 24 is positioned in contact with the guide 18 or 218, the blade unit 26 is spaced apart and parallel to the guide 18 or 218 (FIGS. 1, 2, 3 and 4). In this embodiment, there are two scoring blade units 26 mounted on the second end 24B, facing in opposite directions. The two blade units 26 allow for a replacement blade. The blade units 26 are attached to the body 24 by a bolt 28 which mounts two washers 30 and 32 between which are mounted the blade units 26 (FIG. 3). Preferably, the second washer 32 adjacent the second end 24B of the body 24 has stops 32A on the top surface 12D which hold the blade units 26 in the squared position. The bolt 28 is mounted and secured through the washers 30 and 32 into the second end 24B of the body 24 so that the blade units 26 are secured to the body 24.

Figure 6:
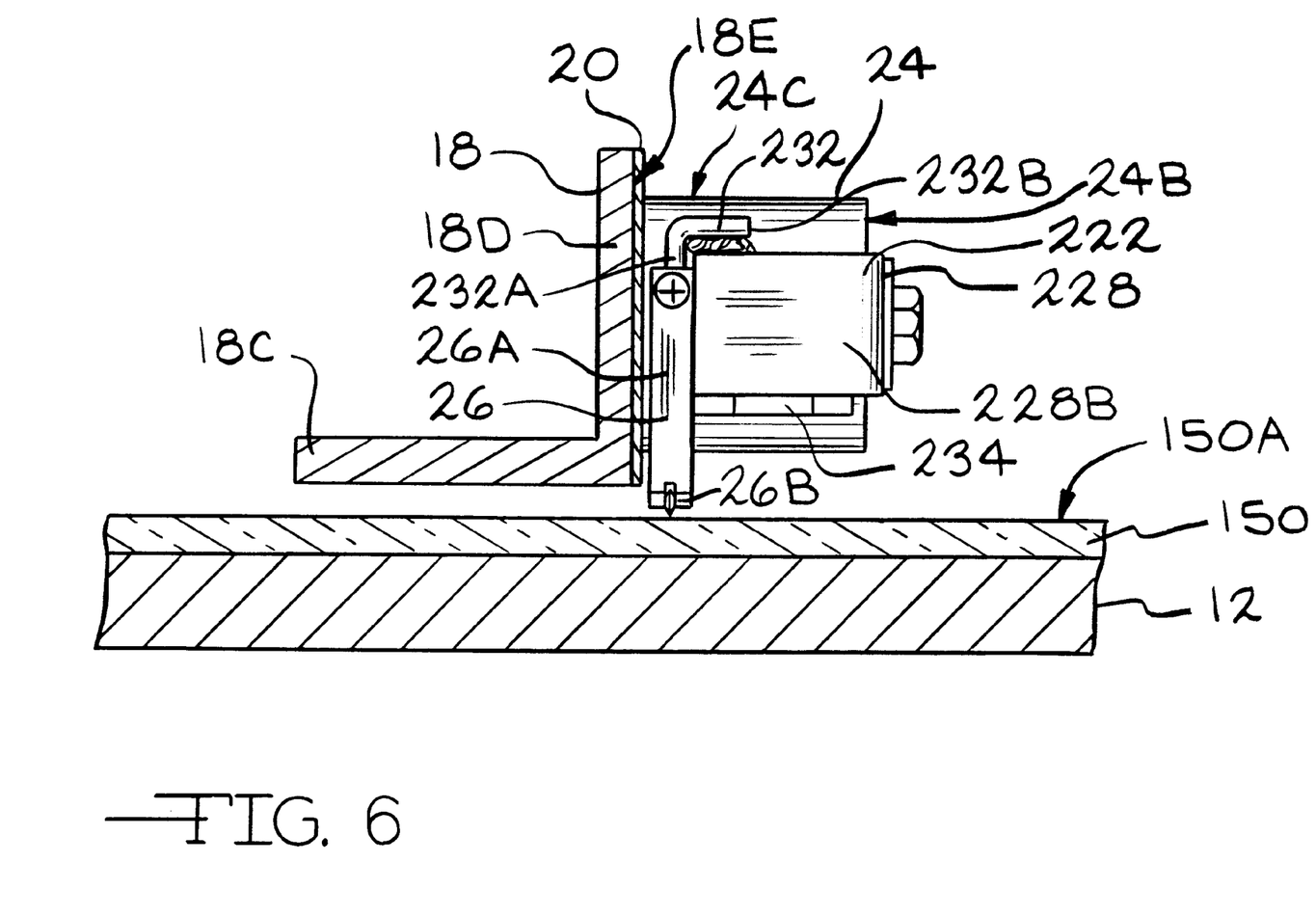
FIG. 6 is a cross-sectional view of the scoring unit 222 of the second embodiment taken along the line 6—6 of FIG. 5 showing the scoring blade 26B adjacent the guide 18.

In the second embodiment of the scoring unit or device 222, the scoring blade unit 26 is mounted on the second end 24B of the body 24 but is positioned adjacent the first end 24A of the body 24 (FIGS. 5 and 6). The blade unit 26 is mounted on the body 24 by an L-shaped bracket 228 having a first leg 228A and a second leg 228B (FIG. 5). The bracket 228 is mounted so that the first leg 228A of the bracket 228 is mounted on the second end 24B of the body 24 and the second leg 228B extends toward the first end 24A of the body 24. The second leg 228B of the bracket 228 is spaced apart from the sidewall 24C of the body 24 and extends preferably parallel to the sidewall 24C of the body 24. Preferably, the second leg 228B of the bracket 228 does not extend completely to the first end 24A of the body 24. The bracket 228 is mounted onto the body 24 by a bolt 230; however, any other fastening means such as welding could also be used. The scoring blade unit 26 is mounted on the second leg 228B of the bracket 228 by a curved rod 232 which extends along the top of the second leg 228B toward the first end 24A of the body 24. The first end 232A of the curved rod 232 is mounted on the second leg 228B of the bracket 228 and the second end 232B of the curved rod 232 is mounted on the end of the blade support 26A of the blade unit 26 opposite the blade. The blade unit 26 is preferably mounted so that the blade 26B is below the sidewall 24C of the body 24 of the scoring device 222 so that when the first end 24A of the body 24 of the scoring device 222 is adjacent and in contact with the scoring guide 18 or 218, the blade support 26A and the blade 26B of the blade unit 26 are slightly spaced apart from and parallel to the scoring guide 18 or 218. The second leg 228B of the bracket 228 also has a thumb rest 234 which extends outward perpendicular to the second leg 228B in a direction opposite the sidewall 24C of the body 24 of the scoring device 222. The thumb rest 234 is mounted above the blade 26B and the glass 150 when the blade 26B is in contact with the glass 150. The thumb rest 234 preferably extends outward approximately equal to the width of an average adult thumb. The thumb rest 234 allows for easier manipulation of the scoring device 222. In either embodiment, the blade 26B is preferably spaced between 2.0 to 15.0 mm (0.079 to 0.59 inches) below the sidewall 24C of the body 24 of the scoring device 22 or 222.

Figure 8:
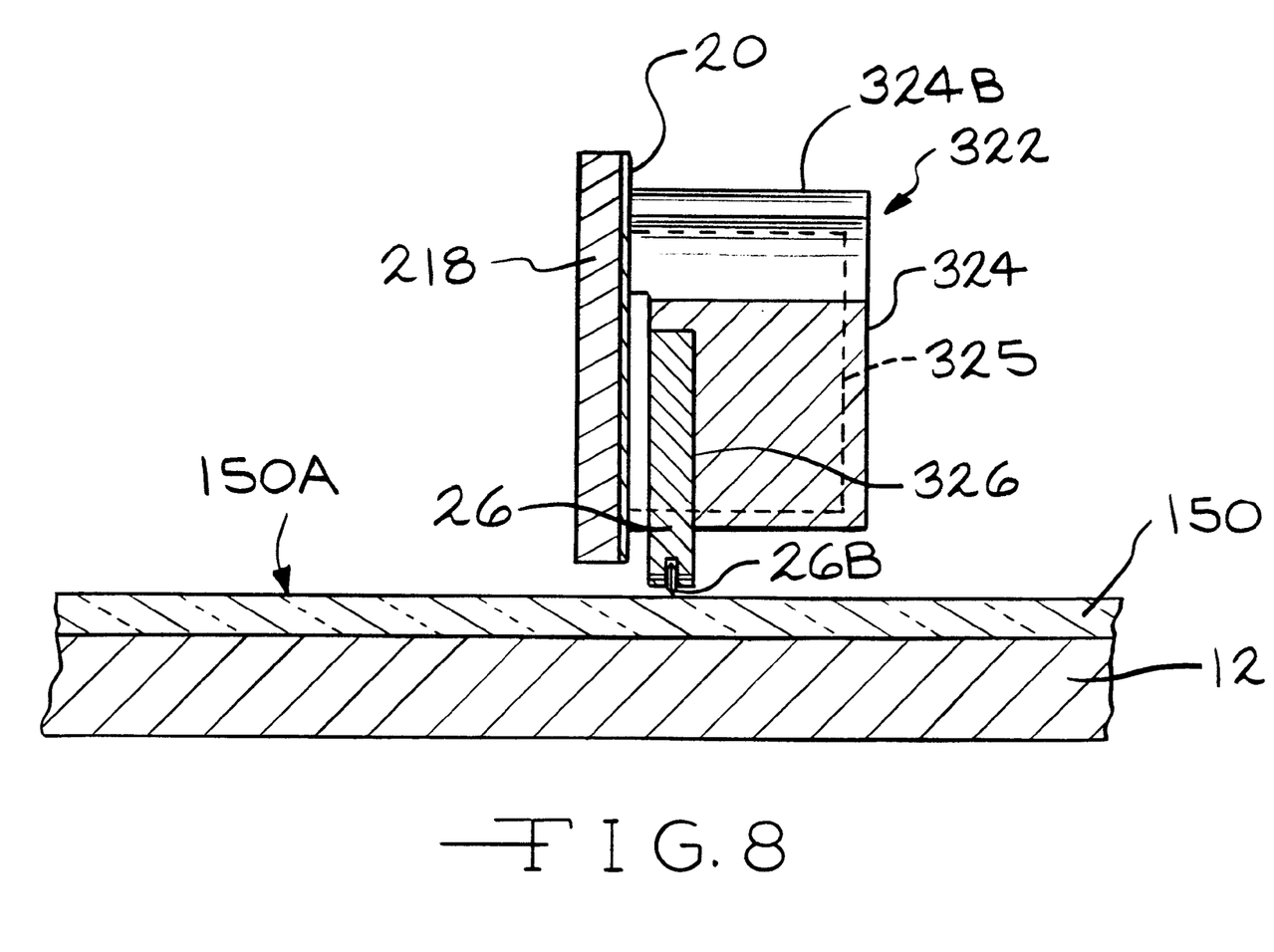
FIG. 8 is a cross-sectional view of the glass scoring unit 322 of the third embodiment taken along line 8—8 of FIG. 7.

In the third embodiment as shown in FIGS. 7 and 8, the scoring device 322 is constructed as a single piece support housing 324 which has a chamber (not shown) for the body 325 having the smooth flat end and a chamber 326 for the blade unit 26. The flat end of the body 325 is preferably magnetized. Alternately, the flat end of the body 325 is constructed of a magnetic attractable material and the scoring guide 18 or 218 is magnetized. Preferably, the force of the magnetic attraction between the body 325 of the scoring device 322 and the scoring guide 18 or 218 is similar to that in the first and second embodiments. The blade unit 26 is preferably held in the chamber 326 by a nut and bolt assembly 328. The support housing 324 preferably includes a thumb rest portion 324A as well as finger supports 324B such as to allow better gripping and positioning of the device 322 (FIG. 7). The housing 324 is also preferably provided with blade position indicators in the form of a pointer 330 on the front end of the housing 324 and an indicator line 332 on the thumb rest portion 324A of the housing 324. The pointer 330 indicates the distance the blade 26B is from the scoring guide 18 or 218. Preferably, the blade 26B is slightly spaced apart from the scoring guide 18 or 218. Similarly to the devices 22 and 222 of the first and second embodiments, the blade 26B is preferably spaced between 2.0 and 15.0 mm (0.079 and 0.59 inches) below the support housing 324. The indicator line 332 indicates the position of the blade 26B in the support housing 324. The support housing 324 is preferably made of any durable material such as plastic.

IN USE

To score and cut glass, the scoring guide 18 or 218 and unit 22, 222 or 322 are used separately or with the scoring board 12. Alternately, the glass scoring device 22, 222 or 322 is used by itself with any magnetic material used as a guide. To score a glass sheet 150, the glass sheet 150 is first marked indicating the desired position of the break or cut in the glass 150. Preferably, the mark is in the form of a marking line (not shown). The glass 150 can also be randomly cut. To score glass 150 using the glass scoring system 100 with the board 12, guide 18 or 218 and device 22, 222 or 322, the glass sheet 150 is first placed on the top surface 12D of the scoring board 12. The scoring guide 18 or 218 is then positioned in place on the board 12 over the glass sheet 150. Alternately, the glass sheet 150 is slid between the guide 18 or 218 and the board 12 after the guide 18 or 218 has been positioned to the board 12. In an alternate embodiment, where the guide 18 or 218 is pivotally attached to the board 12, the guide 18 or 218 is pivoted upward and the glass sheet 150 is positioned on the board 12. The guide 18 or 218 is then lowered and the other end of the guide 18 or 218 is fastened on the board 212. The guide 18 or 218 is fastened on the board 212 such that the guide 18 or 218 is spaced slightly above the glass sheet 150. Preferably, the guide 18 or 218 is not in contact with the glass sheet 150. Alternately, the bottom surface of the guide 18 or 218 is provided with a cushioning spacer (not shown) which allows the guide 18 or 218 to be positioned directly on the top surface 150A of the glass 150. The spacer is preferably constructed of cork or rubber or some other resilient material which will not scratch the surface 150A of the glass 150. Once the guide 18 or 218 is fastened on the board 12, the glass sheet 150 is then positioned so that the smooth and flat outer surface 18E or 218C of the guide 18 or 218 is parallel to and adjacent the break line on the glass sheet 150. Next, the scoring device 22, 222 or 322 is positioned on the guide 18 or 218. The scoring device 22 or 222 of the first and second embodiments are positioned so that the first end 24A of the body 24 is adjacent and in contact with the smooth outer surface 18E or 218C of the guide 18 or 218. The scoring device of the third embodiment 322 is positioned such that the exposed flat surface (end) of the body 325 is in contact with the smooth outer surface 18E or 218C of the guide 18 or 218. When the scoring device 22, 222 or 322 is correctly positioned, the blade unit 26 extends downward so that the blade 26B is adjacent the marking line on the top surface 12D of the glass 150 (FIGS. 2 and 6).

The difference in the blade unit 26 location on the body 24 of the devices 22, 222 or 322 for the different units 22, 222 or 322 necessitates that the guide 18 or 218 be positioned a predetermined distance from the break line. In the first embodiment of the device 22, the blade unit 26 is on the second end 24B of the body 24 (FIG. 2). The blade unit 26 and blade 26B are spaced apart from the guide 18 or 218 a distance slightly greater than the width of the body 24 of the device 22. In the second and third embodiments of the device 222 or 322, the blade unit 26 and blade 26B are spaced adjacent the smooth end of the body 24 or the body 325, respectively (FIGS. 6 and 8). Thus, when the body 24 or 325 is correctly mounted on the guide 18 or 218, the blade 26B is only slightly spaced apart from the guide 18 or 218. The glass sheet 150 is positioned or alternately the guide 18 or 218 is positioned so that when the device 22, 222 or 322 is correctly positioned on the guide 18 or 218, the blade 26A of the blade unit 26 is aligned and in contact with the marking line. In all the embodiments, the blade unit 26 is parallel to the guide 18 or 218 such as to make a score line spaced apart and parallel to the guide 18 or 218. Thus, the glass sheet 150 must be positioned with the marking line parallel to the guide 18 or 218 and spaced apart from the guide 18 or 218 a distance equal to the distance between the first end 24A of the body 24 or the flat end of the body 325 and the blade 26A of the blade unit 26 in the scoring device 22, 222 or 322. The devices 22, 222 or 322 can be easily used by left handed or right handed users. However, the L-shaped guide 18 of the first embodiment would have to be rotated to accommodate the different users (FIGS. 1 and 2).

To begin scoring glass 150, the device 22, 222 or 322 is moved to adjacent one end of the glass 150 and positioned with the blade 26B slightly spaced apart from one end of the glass 150. The blade 26B is preferably slightly in contact with the top surface 150A of the glass 150 and is aligned with the marking line. Next, the user exerts downward pressure on the body 24 or support housing 324 of the device 22, 222 or 322 so that the blade 26B more firmly contacts the glass 150. Simultaneously, while exerting the downward force, the user pushes or pulls the device 22, 222 or 322 toward the closest end of the glass 150. This initial short cut prevents the corners of the glass 150, adjacent the marking line, from breaking when the glass 150 is finally broken along the score line. The user then moves the device 22, 222 or 322 toward the other end of the glass 150, exerting the same downward force. The device 22, 222 or 322 can be used to score glass 150 in any shape. However, the scoring guide 18 or 218 must enable the scoring device 22, 222 or 322 to precisely follow the marking line. The shape of the guide 18 or 218 directly accounts for the shape of the score. Once the glass sheet 150 has been scored along the marking line, the glass sheet 150 is broken along the score line.

The guide 18 or 218 and scoring device 22, 222 or 322 can be used without the scoring board 12. In the one embodiment, the T-shaped end of the guide 18 is placed over the edge of the glass 150 so that the edge of the guide 18 is adjacent and parallel to the marking line on the glass sheet 150. The device 22, 222 or 322 is then moved along the guide 18 as described above. Use of a T-square as a straight edge to score glass is well known in the art.

It is intended that the foregoing description be only illustrative of the present invention and that the present invention be limited only by the hereinafter appended claims.

I claim:

1. A unit for precision scoring glass which comprises:
   (a) a body having opposed ends with a sidewall spaced therebetween, wherein one of the ends has a smooth outer surface; and
   (b) a glass scoring means mounted on the body for scoring the glass by movement of the glass scoring means and the body along a scoring guide wherein the end of the body having the smooth outer surface is attached to and held in direct contact with a surface of the scoring guide only by magnetic means and magnetically attractable means between the surface of the scoring guide and the smooth outer surface of one of the ends of the body and wherein a magnetic attraction between the guide and the smooth outer surface of one of the ends of the body holds one of the ends of the body in direct contact with the surface of the scoring guide during movement of the body along the scoring guide.

2. The unit of claim 1 wherein the body is magnetic.

3. The unit of claim 2 wherein the body ha a magnetic attraction of between 1.0 and 50.0 lbs.

4. The unit of claim 1 wherein a thumb rest is mounted on the sidewall of the body to allow for applying pressure on the scoring means to score the glass.

5. The unit of claim 1 wherein the scoring means is mounted on the other end of the body opposite the end having the smooth outer surface.

6. The unit of claim 1 wherein the glass scoring means is a circular, rotatably mounted glass scoring blade.

7. A glass scoring combination for scoring glass to be broken, which comprises:
   (a) a scoring surface having opposed ends;
   (b) a scoring guide mounted on the scoring surface and having opposed ends with a sidewall having a smooth outer surface spaced therebetween, the scoring guide being positionable between the ends of the scoring surface so that the sidewall is spaced above the scoring surface and the glass;
   (c) a glass scoring unit movable on the sidewall of the scoring guide, which comprises:
      (i) a body having opposed ends with a sidewall therebetween wherein one of the ends of the body has a smooth outer surface for mounting in direct contact with the sidewall of the scoring guide only by magnetic means and magnetically attractable means between the surface of the scoring guide and the smooth outer surface of the end of the body; and
      (ii) a scoring means mounted on the body so that when the body is mounted on the scoring guide, the scoring means extends downward toward the scoring surface wherein to score the glass, the scoring unit is moved along the smooth outer surface of the sidewall of the scoring guide so that the scoring means contacts the glass to score the glass wherein a magnetic attraction between the guide and the smooth outer surface of one of the ends of the body acts alone to hold the end of the body having the smooth outer surface in direct contact with the surface of the scoring guide during movement of the body along the scoring guide and wherein the glass is then broken along the score.

8. The unit of claim 7 wherein a lubrication layer is mounted on the smooth outer surface of the sidewall of the scoring guide to allow the scoring means to move easily along the scoring guide.

9. The combination of claim 7 wherein the scoring guide is constructed of steel.

10. The combination of claim 7 wherein the scoring guide has a length greater than a length of the glass to be cut.

11. The combination of claim 7 wherein the body of the scoring unit is magnetic.

* * * * *